United States Patent [19]

Flemming, Jr.

[11] Patent Number: 4,569,633
[45] Date of Patent: Feb. 11, 1986

[54] AIRFOIL SECTION FOR A ROTOR BLADE OF A ROTORCRAFT

[75] Inventor: Robert J. Flemming, Jr., Trumbull, Conn.

[73] Assignee: United Technologies Corporation, Hartford, Conn.

[21] Appl. No.: 485,788

[22] Filed: Apr. 18, 1983

[51] Int. Cl.$^4$ ............................................. B64C 27/46
[52] U.S. Cl. ............................. 416/228; 416/DIG. 2; 416/242
[58] Field of Search .................. 416/228, 242, DIG. 2

[56] References Cited

U.S. PATENT DOCUMENTS 4,412,664  11/1983  Noonan ............................ 244/35 R

FOREIGN PATENT DOCUMENTS

0024229  2/1981  European Pat. Off. .
0048649  3/1982  European Pat. Off. .
1450965  9/1976  United Kingdom .
2059373  9/1983  United Kingdom .

*Primary Examiner*—Stephen C. Bentley
*Attorney, Agent, or Firm*—Gene D. Fleischhauer

[57] ABSTRACT

An airfoil shaped cross section 36 for the rotor blade 14 is disclosed. Various construction details which improve the aerodynamic and drag performance of the airfoil section are developed. The upper surface 38 and the lower surface 42 are contoured by a thickness distribution and a camber distribution such that the bend of the surfaces is constant or changes at a constant rate over certain regions of the airfoil to avoid the formation of strong, normal shock waves at local Mach numbers less than 1.2 during normal, level flight conditions at standard temperature and pressure.

6 Claims, 10 Drawing Figures

TABLE I

AIRFOIL CHARACTERISTICS

| X | $D_u$ | $D_l$ | CN | TN |
|---|---|---|---|---|
| 0.0 | 0.0 | 0.0 | 0.0 | 0.0 |
| 0.000199 | 0.022226 | -0.016152 | 0.003037 | 0.038378 |
| 0.000798 | 0.043840 | -0.031879 | 0.005980 | 0.075719 |
| 0.001994 | 0.072016 | -0.050806 | 0.009430 | 0.120473 |
| 0.002991 | 0.089207 | -0.060515 | 0.014346 | 0.149722 |
| 0.004487 | 0.109650 | -0.071606 | 0.019022 | 0.181256 |
| 0.006979 | 0.137684 | -0.085584 | 0.026050 | 0.223267 |
| 0.009970 | 0.165784 | -0.098637 | 0.033574 | 0.264421 |
| 0.015952 | 0.211954 | -0.118935 | 0.046509 | 0.330888 |
| 0.021934 | 0.249997 | -0.135276 | 0.057361 | 0.385273 |
| 0.027916 | 0.282724 | -0.149410 | 0.066657 | 0.432134 |
| 0.033898 | 0.311549 | -0.162084 | 0.074733 | 0.473633 |
| 0.039881 | 0.337432 | -0.173676 | 0.081878 | 0.511108 |
| 0.045863 | 0.361040 | -0.184377 | 0.088332 | 0.545417 |
| 0.051845 | 0.382765 | -0.194297 | 0.094234 | 0.577062 |
| 0.057827 | 0.402762 | -0.203493 | 0.099634 | 0.606256 |
| 0.067797 | 0.432256 | -0.217427 | 0.107415 | 0.649683 |
| 0.077767 | 0.457147 | -0.229900 | 0.113623 | 0.687047 |
| 0.087737 | 0.477958 | -0.241180 | 0.118389 | 0.719138 |
| 0.097707 | 0.495369 | -0.251535 | 0.121917 | 0.746904 |
| 0.112663 | 0.516715 | -0.265669 | 0.125523 | 0.782384 |
| 0.127618 | 0.533936 | -0.278488 | 0.127724 | 0.812424 |
| 0.142573 | 0.548282 | -0.290270 | 0.129006 | 0.838552 |
| 0.157529 | 0.560487 | -0.301160 | 0.129664 | 0.861648 |
| 0.172485 | 0.570943 | -0.311259 | 0.129842 | 0.882202 |
| 0.187440 | 0.579827 | -0.320589 | 0.129619 | 0.900416 |
| 0.202395 | 0.587329 | -0.329205 | 0.129062 | 0.916534 |
| 0.217350 | 0.593638 | -0.337097 | 0.128270 | 0.930735 |
| 0.232305 | 0.599010 | -0.344309 | 0.127351 | 0.943319 |
| 0.247261 | 0.603580 | -0.350874 | 0.126353 | 0.954455 |
| 0.277171 | 0.610647 | -0.362155 | 0.124246 | 0.972802 |
| 0.307082 | 0.615206 | -0.371128 | 0.122039 | 0.986334 |
| 0.336992 | 0.617380 | -0.377861 | 0.119760 | 0.995241 |
| 0.376873 | 0.616600 | -0.383400 | 0.116600 | 1.000000 |
| 0.416754 | 0.611550 | -0.384861 | 0.113345 | 0.996411 |
| 0.436694 | 0.607370 | -0.383980 | 0.111695 | 0.991350 |
| 0.456635 | 0.602020 | -0.381951 | 0.110034 | 0.983971 |
| 0.476575 | 0.595499 | -0.378741 | 0.108379 | 0.974240 |
| 0.496515 | 0.587763 | -0.374260 | 0.106752 | 0.962023 |
| 0.516456 | 0.578813 | -0.368497 | 0.105158 | 0.947310 |
| 0.536396 | 0.568624 | -0.361464 | 0.103580 | 0.930088 |
| 0.556336 | 0.557210 | -0.353226 | 0.101992 | 0.910437 |
| 0.576277 | 0.544548 | -0.343874 | 0.100337 | 0.888422 |
| 0.596217 | 0.530614 | -0.333530 | 0.098542 | 0.864145 |
| 0.616157 | 0.515343 | -0.322250 | 0.096547 | 0.837593 |
| 0.636097 | 0.498612 | -0.310044 | 0.094284 | 0.808657 |
| 0.656039 | 0.480220 | -0.296891 | 0.091665 | 0.777112 |
| 0.675979 | 0.459900 | -0.282757 | 0.088571 | 0.742657 |
| 0.695919 | 0.437417 | -0.267642 | 0.084887 | 0.705060 |
| 0.715860 | 0.412672 | -0.251580 | 0.080546 | 0.664252 |
| 0.735800 | 0.385764 | -0.234682 | 0.075541 | 0.620445 |
| 0.755740 | 0.357094 | -0.217115 | 0.069990 | 0.574209 |
| 0.775680 | 0.327166 | -0.199090 | 0.064038 | 0.526256 |
| 0.795621 | 0.296457 | -0.180799 | 0.057829 | 0.477255 |
| 0.815561 | 0.265235 | -0.162407 | 0.051414 | 0.427642 |
| 0.835501 | 0.233467 | -0.143970 | 0.044748 | 0.377437 |
| 0.855442 | 0.200985 | -0.125433 | 0.037776 | 0.326419 |
| 0.875382 | 0.167701 | -0.106640 | 0.030531 | 0.274341 |
| 0.895323 | 0.133905 | -0.087367 | 0.023269 | 0.221272 |
| 0.915264 | 0.100509 | -0.067571 | 0.016469 | 0.168080 |
| 0.935204 | 0.069210 | -0.047663 | 0.010773 | 0.116873 |
| 0.955144 | 0.042770 | -0.029004 | 0.006883 | 0.071773 |
| 0.975084 | 0.025426 | -0.014725 | 0.005350 | 0.040150 |
| 0.985055 | 0.022082 | -0.011024 | 0.005529 | 0.033106 |
| 0.995025 | 0.023720 | -0.009586 | 0.007067 | 0.033306 |
| 1.000000 | 0.026752 | -0.008917 | 0.008917 | 0.035669 |

TABLE II

| | UPPER SURFACE DERIVATIVES | | | LOWER SURFACE DERIVATIVES | | | |
|---|---|---|---|---|---|---|---|
| X | $D'_u$ | X | $D''_u$ | X | $D'_l$ | X | $D''_l$ |
| 0.000100 | 111.6879 | →0.0 | ∞ | 0.000100 | −81.1613 | →0.0 | ∞ |
| 0.000499 | 36.0822 | 0.000299 | −189485.79 | 0.000499 | −26.2568 | 0.000299 | 137603.812 |
| 0.001396 | 23.5585 | 0.000947 | −13961.730 | 0.001396 | −15.8250 | 0.000947 | 11622.945 |
| 0.002493 | 17.2427 | 0.001944 | −5757.338 | 0.002493 | −9.7378 | 0.001944 | 5551.414 |
| 0.003739 | 13.6695 | 0.003116 | −2867.759 | 0.003739 | −7.4161 | 0.003116 | 1862.936 |
| 0.005733 | 11.2471 | 0.004736 | −1214.801 | 0.005733 | −5.6079 | 0.004736 | 905.799 |
| 0.008475 | 9.3950 | 0.007104 | −675.530 | 0.008475 | −4.3639 | 0.007104 | 453.699 |
| 0.012961 | 7.7179 | 0.010718 | −373.785 | 0.012961 | −3.3931 | 0.010718 | 216.382 |
| 0.018943 | 6.3596 | 0.015952 | −227.073 | 0.018943 | −2.7317 | 0.015952 | 110.577 |
| 0.024925 | 5.4708 | 0.021934 | −148.579 | 0.024925 | −2.3627 | 0.021934 | 61.676 |
| 0.030907 | 4.8186 | 0.027916 | −109.019 | 0.030907 | −2.1186 | 0.027916 | 40.802 |
| 0.036890 | 4.3267 | 0.033898 | −82.235 | 0.036890 | −1.9379 | 0.033898 | 30.216 |
| 0.042872 | 3.9466 | 0.039881 | −63.541 | 0.042872 | −1.7888 | 0.039881 | 24.918 |
| 0.048854 | 3.6317 | 0.045863 | −52.640 | 0.048854 | −1.6584 | 0.045863 | 21.806 |
| 0.054836 | 3.3428 | 0.051845 | −48.283 | 0.054836 | −1.5373 | 0.051845 | 20.244 |
| 0.062812 | 2.9583 | 0.058824 | −48.215 | 0.062812 | −1.3975 | 0.058824 | 17.522 |
| 0.072782 | 2.4965 | 0.067797 | −46.315 | 0.072782 | −1.2510 | 0.067797 | 14.691 |
| 0.082752 | 2.0873 | 0.077767 | −41.040 | 0.082752 | −1.1314 | 0.077767 | 11.998 |
| 0.092722 | 1.7463 | 0.087737 | −34.203 | 0.092722 | −1.0386 | 0.087737 | 9.307 |
| 0.105185 | 1.4273 | 0.098954 | −25.595 | 0.105185 | −0.9451 | 0.098954 | 7.505 |
| 0.120140 | 1.1515 | 0.112663 | −18.441 | 0.120140 | −0.8571 | 0.112663 | 5.891 |
| 0.135095 | 0.9593 | 0.127618 | −12.857 | 0.135095 | −0.7878 | 0.127618 | 4.634 |
| 0.150051 | 0.8161 | 0.142573 | −9.573 | 0.150051 | −0.7281 | 0.142573 | 3.971 |
| 0.165007 | 0.6991 | 0.157529 | −7.820 | 0.165007 | −0.6753 | 0.157529 | 3.534 |
| 0.179962 | 0.5940 | 0.172485 | −7.027 | 0.179962 | −0.6238 | 0.172485 | 3.440 |
| 0.194917 | 0.5016 | 0.187440 | −6.180 | 0.194917 | −0.5761 | 0.187440 | 3.189 |
| 0.209873 | 0.4219 | 0.202395 | −5.333 | 0.209873 | −0.5277 | 0.202395 | 3.240 |
| 0.224828 | 0.3593 | 0.217350 | −4.186 | 0.224828 | −0.4822 | 0.217350 | 3.040 |
| 0.239783 | 0.3056 | 0.232305 | −3.588 | 0.239783 | −0.4390 | 0.232305 | 2.891 |
| 0.262216 | 0.2363 | 0.250999 | −3.090 | 0.262216 | −0.3771 | 0.250999 | 2.757 |
| 0.292126 | 0.1524 | 0.277171 | −2.803 | 0.292126 | −0.3000 | 0.277171 | 2.579 |
| 0.322037 | 0.0727 | 0.307082 | −2.665 | 0.322037 | −0.2251 | 0.307082 | 2.504 |
| 0.356932 | −0.0196 | 0.339484 | −2.643 | 0.356932 | −0.1389 | 0.339484 | 2.470 |
| 0.396813 | −0.1266 | 0.376873 | −2.684 | 0.396813 | −0.0366 | 0.376873 | 2.565 |
| 0.426724 | −0.2096 | 0.411769 | −2.775 | 0.426724 | 0.0442 | 0.411769 | 2.701 |
| 0.446665 | −0.2683 | 0.436694 | −2.944 | 0.446665 | 0.1017 | 0.436694 | 2.887 |
| 0.466605 | −0.3270 | 0.456635 | −2.944 | 0.466605 | 0.1610 | 0.456635 | 2.972 |
| 0.486545 | −0.3879 | 0.476575 | −3.056 | 0.486545 | 0.2247 | 0.476575 | 3.196 |
| 0.506485 | −0.4489 | 0.496515 | −3.056 | 0.506485 | 0.2890 | 0.496515 | 3.224 |
| 0.526426 | −0.5109 | 0.516456 | −3.112 | 0.526426 | 0.3527 | 0.516456 | 3.196 |
| 0.546366 | −0.5724 | 0.536396 | −3.084 | 0.546366 | 0.4131 | 0.536396 | 3.028 |
| 0.566306 | −0.6350 | 0.556336 | −3.140 | 0.566306 | 0.4690 | 0.556336 | 2.803 |
| 0.586247 | −0.6988 | 0.576276 | −3.196 | 0.586247 | 0.5188 | 0.576276 | 2.495 |
| 0.606187 | −0.7658 | 0.596217 | −3.364 | 0.606187 | 0.5657 | 0.596217 | 2.355 |
| 0.626127 | −0.8391 | 0.616157 | −3.672 | 0.626127 | 0.6121 | 0.616157 | 2.327 |
| 0.646068 | −0.9223 | 0.636098 | −4.175 | 0.646068 | 0.6596 | 0.636098 | 2.381 |
| 0.666009 | −1.0191 | 0.656038 | −4.852 | 0.666009 | 0.7088 | 0.656038 | 2.468 |
| 0.685949 | −1.1275 | 0.675979 | −5.439 | 0.685949 | 0.7580 | 0.675979 | 2.467 |
| 0.705889 | −1.2410 | 0.695919 | −5.691 | 0.705889 | 0.8055 | 0.695919 | 2.383 |
| 0.725830 | −1.3494 | 0.715860 | −5.439 | 0.725830 | 0.8474 | 0.715860 | 2.103 |
| 0.745770 | −1.4377 | 0.735800 | −4.429 | 0.745770 | 0.8810 | 0.735800 | 1.682 |
| 0.765710 | −1.5009 | 0.755740 | −3.168 | 0.765710 | 0.9039 | 0.755740 | 1.149 |
| 0.785651 | −1.5401 | 0.775680 | −1.963 | 0.785651 | 0.9173 | 0.775680 | 0.673 |
| 0.805591 | −1.5658 | 0.795621 | −1.289 | 0.805591 | 0.9224 | 0.795621 | 0.252 |
| 0.825531 | −1.5932 | 0.815561 | −1.374 | 0.825531 | 0.9246 | 0.815561 | 0.112 |
| 0.845472 | −1.6289 | 0.835501 | −1.794 | 0.845472 | 0.9296 | 0.835501 | 0.252 |
| 0.865412 | −1.6692 | 0.855442 | −2.018 | 0.865412 | 0.9425 | 0.855442 | 0.645 |
| 0.885353 | −1.6948 | 0.875382 | −1.285 | 0.885353 | 0.9665 | 0.875382 | 1.203 |
| 0.905293 | −1.6748 | 0.895323 | 1.005 | 0.905293 | 0.9928 | 0.895323 | 1.320 |
| 0.925234 | −1.5697 | 0.915263 | 5.270 | 0.925234 | 0.9984 | 0.915263 | 0.280 |
| 0.945174 | −1.3260 | 0.935204 | 12.223 | 0.945174 | 0.9358 | 0.935204 | −3.140 |
| 0.965114 | −0.8698 | 0.955144 | 22.876 | 0.965114 | 0.7161 | 0.955144 | −11.017 |
| 0.980069 | −0.3354 | 0.972592 | 35.734 | 0.980069 | 0.3712 | 0.972592 | −23.062 |
| 0.990040 | 0.1643 | 0.985055 | 50.124 | 0.990040 | 0.1442 | 0.985055 | −22.763 |
| 0.997512 | 0.6094 | 0.993776 | 59.558 | 0.997512 | 0.1344 | 0.993776 | −1.311 |

AIRFOIL SECTION FOR A ROTOR BLADE OF A ROTORCRAFT

DESCRIPTION

1. Technical Field

This invention relates to rotor blades for a rotorcraft and more particularly to the contour of an airfoil shaped cross section for the tip region of the rotor blade.

2. Background Art

Rotorcraft, such as helicopters, have a main rotor and a tail rotor for propelling the helicopter in a desired direction. The main rotor includes a plurality of rotor blades. An engine is coupled to the main rotor for driving the blades about an axis of rotation. An airfoil on each blade adapts the blade to develop a propulsive force for the helicopter. The shape of this airfoil has a strong effect on the performance of the helicopter.

The shape of the airfoil is defined by a plurality of airfoil sections. These airfoil sections are spaced apart along a spanwisely extending axis. An upper surface and a lower surface join the airfoil sections together to form the airfoil of the rotor blade.

As the rotor blades are driven about the axis of rotation, relative motion between the airfoil of each blade and a working fluid, such as air, causes the fluid to exert a resultant force on the airfoil. This force by convention is broken into two components. One component is an upward force perpendicular to the direction of relative motion of the fluid ahead of the airfoil. The upward force is called lift. Another component acting parallel to the direction of relative motion is called the resistance or drag.

These two forces, lift and drag, are of major concern to aerodynamicists. The airfoil is generally cambered (curved) and thicker in the forward portion of the airfoil to increase lift. As the airfoil becomes more cambered, relative velocities between the blade and the air increase, increasing drag and increasing the probability of generating a strong shock wave which causes noise and large aerodynamic losses. These losses decrease the aerodynamic performance of the airfoil and the efficiency of the helicopter.

There are two generally accepted measures of airfoil performance which focus on lift and drag. For lift, the measure is the maximum lift coefficient at a low Mach number such as a Mach number of three-tenths ($M = 0.3$). For drag, the measure is the Mach number at which the slope of the drag coefficient-Mach number curve (at a constant lift coefficient) increases to become equal to one-tenth (0.1). The Mach number at which this occurs is referred to as the drag divergence Mach number (Mdd).

Still another concern for aerodynamicists is the airfoil pitching moment. The pitching moment results from unbalanced aerodynamic forces acting on the airfoil. These forces cause bending stresses in the airfoil. The bending stresses are measured about a reference axis spaced chordwisely from the leading edge of the airfoil. The reference axis is generally taken to be the spanwisely extending quarter-chord axis. A blade-pitching moment coefficient Cm provides a normalized measure of the pitching moment. The pitching moment coefficient is equal to the bending moment M acting on the airfoil section divided by the quantity resulting from multiplying one half the density $\rho$ of the air by the square of the relative velocity V, by the area A of the airfoil section, and by the chord length C of the airfoil section ($Cm = M/(\frac{1}{2}\rho V^2 \cdot A \cdot C)$).

One approach to accommodating the concerns about lift, drag, and bending moments on the airfoil is to adjust the contours of the upper surface and the lower surface until an acceptable airfoil results. A tailored camber distribution (variation in camber along the chord line) and thickness distribution (variation in thickness along the chord line) is used to describe the contour. Examples of this approach are shown in U.S. Pat. No. 4,314,795 issued to Dadone entitled "Advanced Airfoils for Helicopter Rotor Application", U.S. Pat. No. 4,142,837 issued to deSimone entitled "Helicopter Blade" and U.S. Pat. No. 3,728,045 issued to Balch entitled "Helicopter Blade".

Figure 10:
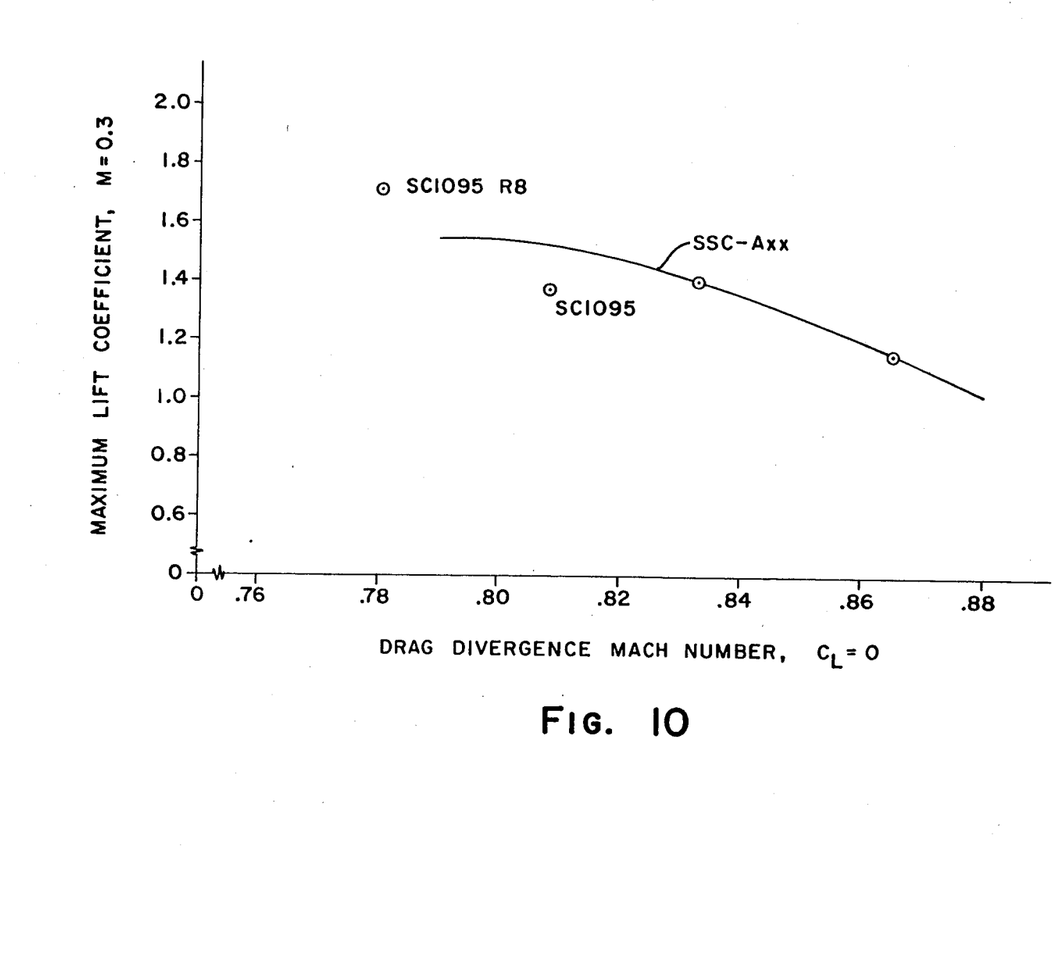
FIG. 10 is a graphical representation of the maximum lift coefficient at a Mach number of three-tenths (M=0.3) and the drag divergence Mach number for an airfoil section (SC1095) of the SC10xx family of airfoil sections, for an airfoil section (SC1095 R8) of the SC10xx R8 airfoil family and for the SSC-Axx family of airfoil sections, each point on the curve being a separate airfoil section having an associated maximum lift coefficient and drag divergence Mach number.

Both the Balch patent and the deSimone patent are assigned to the assignee of this invention. The airfoil sections disclosed by the Balch patent are known as the SC10xx family of airfoil sections. The airfoil sections disclosed by the deSimone patent are known as SC10xx R8 family of airfoil sections. FIG. 10 shows, for an airfoil section of the SC10xx family (SC1095) and for an airfoil section of the SC10xx R8 family (SC1095 R8), the maximum lift coefficient at a Mach number equal to three-tenths ($M = 0.3$) and the drag divergence Mach number Mdd at a lift equal to zero.

As can be seen, the SC1095 R8 airfoil section has a greater maximum lift coefficient than the SC1095 airfoil section. The SC10xx R8 family has particular application to airfoil sections which are placed inward of the tip portion of the rotor blade at a location on the blade where an airfoil section sees lower relative velocities in the operating envelope of the rotorcraft.

As new rotors are developed to operate at higher flight speeds, even higher velocities will occur at the tip portion of the rotor blade causing local velocities on the airfoil to exceed the speed of sound ($M > 1.0$) for greater spanwise portions of the blade. Although airfoil sections from the SC10xx family might be used in the tip portion of a new airfoil, it is desirable to develop a new airfoil section for the tip portion to increase the drag divergence Mach number at a given lift over the SC10xx airfoil sections while still keeping the pitching moment coefficient Cm between plus or minus three-hundredths ($Cm = \pm 0.03$) as is taught for the SC10xx family in the Balch patent. The new airfoil section would also have application at lower rotational speeds by providing increased lift and decreased noise at a given drag divergence Mach number in comparison to the SC1095 family of airfoils. In addition, the new airfoil section would have to avoid significant increases in drag at Mach numbers below the drag divergence Mach number. This significant increase in drag is commonly referred to as drag creep.

Accordingly, aerodynamic engineers are working to develop a new family of airfoil sections for the tip portion of the rotor blade which will provide better performance than the SC10xx family and which will be complementary to the SC10xx R8 family such that a rotor blade may be made by combining airfoil sections from the new family and the SC10xx R8 family.

DISCLOSURE OF INVENTION

According to the present invention, an airfoil section for the tip portion of a rotor blade for a rotorcraft has a thickness distribution and camber distribution which result in a relatively thick leading edge region, a thick central chord region and a tapered trailing edge region bounded by an upper surface and a lower surface which have the same degree of flatness in the central chord region and which are contoured by the thickness distribution and camber distribution to bend toward the chord line at predetermined rates over critical regions of the airfoil section.

A primary feature of the present invention is an airfoil section having a leading edge region, a central chord region and a trailing edge region. The point of maximum camber occurs at the end of the leading edge region. The slope of the camber distribution across the central chord region is nearly constant. The central chord region terminates at the point where the slope of the camber distribution becomes twice as negative as the average slope across the central chord region. Another feature is the comparative thinness of the lower surface relative to the thickness of the upper surface. The ratio of the thickness of the lower surface to the thickness of upper surface lies in the range of fifty to seventy percent (50-70%) and is nearly constant over substantially the entire chord length of the airfoil section. Another feature is the bend on the upper surface and the lower surface. The bend on the upper surface decreases at a nearly constant rate over the middle portion of the leading edge region. The bend on the lower surface decreases at a rapidly decreasing rate between the leading edge and one percent (1%) chord. Still another feature in the central chord region is the flatness of the upper surface and the flatness of the lower surface which are nearly equal over the central chord region. Another feature is the trailing edge reflex at the end of the trailing edge region.

A principal advantage of the present invention is the relationship between the maximum lift coefficient and the drag divergence Mach number which results from the combined effect of the thickness distribution and camber distribution. An advantage is the level of drag before drag divergence at local Mach numbers between one and one and two-tenths $(1.0<M<1.2)$ at positive, zero and negative angles of attack which results from the controlled bend of the upper surface and the lower surface toward the chord line. Still another advantage is the avoidance of strong, normal shock waves at the maximum level of local Mach numbers at normal level flight conditions $(M<1.2)$ on each surface which results from the controlled bend of the upper surface and lower surface.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
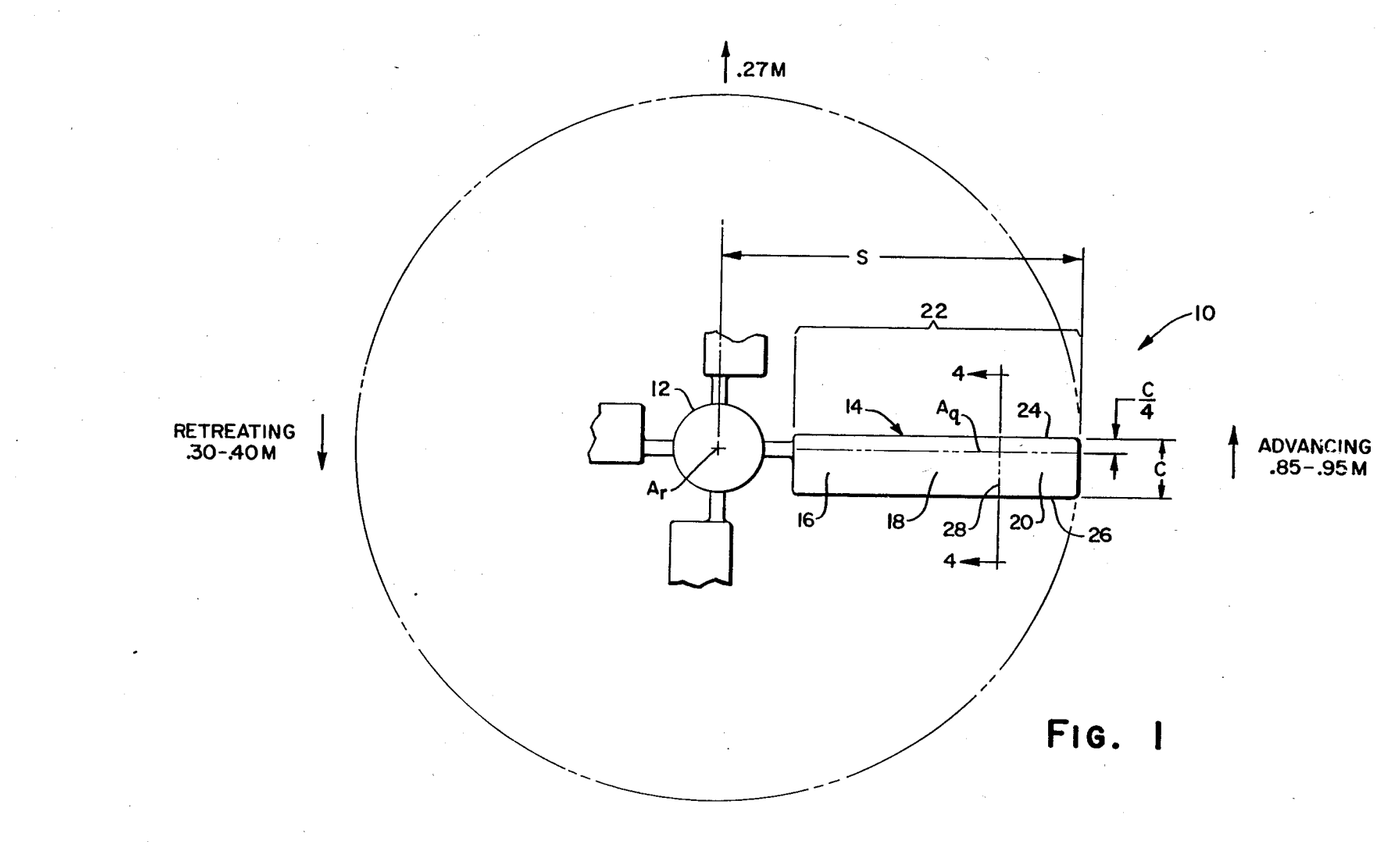
FIG. 1 is a schematic view from above of a rotor blade for a rotorcraft.

FIG. 1 is a schematic view from above of a helicopter rotor 10. The rotor assembly includes a rotor hub 12 rotatable about an axis of rotation $A_r$. A plurality of rotor blades, as represented by the rotor blades 14, extend radially outwardly from the rotor hub. Under normal level flight conditions, the forward flight speed is a Mach number of twenty-seven hundredths ($M_h=0.27$), the advancing blade free stream velocity is a Mach number of eighty-five hundredths to ninety-five hundredths ($M_{afs}=0.85-0.95$), and the retreating blade free stream velocity is a Mach number of three tenths to four tenths ($M_{rfs}=0.3-0.4$).

The rotor blade 14 includes a root portion 16 which adapts the blade to engage the hub, a central portion 18 and a tip portion 20. The distance S from the axis of rotation Ar to the radially outermost portion of the rotor blade is the span of the rotor blade. The tip portion of the rotor blade is the outermost thirty percent of the span S.

Each rotor blade has an airfoil 22 attached to the rotor hub. The airfoil includes a spanwisely extending leading edge 24 and a spanwisely extending trailing edge 26. A chord line 28 extends from the leading edge and trailing edge. For the airfoil shown, the chord line is perpendicular to both edges. The chord line has an associated chord length C at each spanwise location of the rotor blade. The chord length C may change as the distance from the axis of rotation Ar changes. A quarter chord axis $A_q$ lies in a plane containing the axis of rotation Ar. The chord line extends perpendicular to the axis $A_q$. The distance of the quarter chord axis from the leading edge is one quarter of the distance C between the leading edge and the trailing edge.

Figure 2:
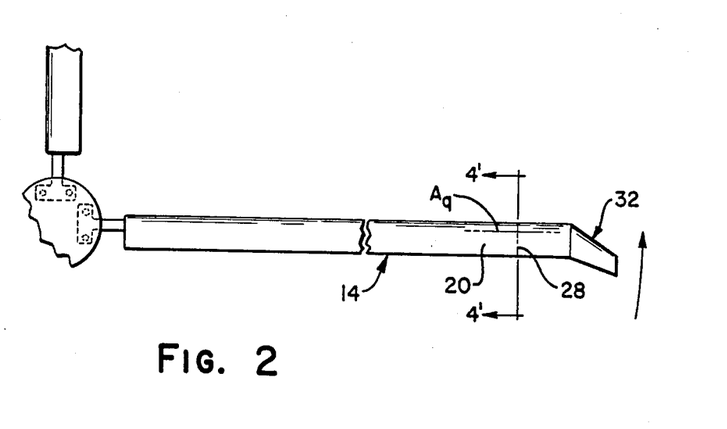
FIG. 2 is an enlarged view from above of an alternate embodiment of the rotor blade shown in FIG. 1.

FIG. 2 is an alternate embodiment of the rotor blade shown in FIG. 1 illustrating a rotor blade having a tip portion 20 which includes an end 32. The end is selectively shaped to include a rearward sweep, taper and droop.

Figure 3:
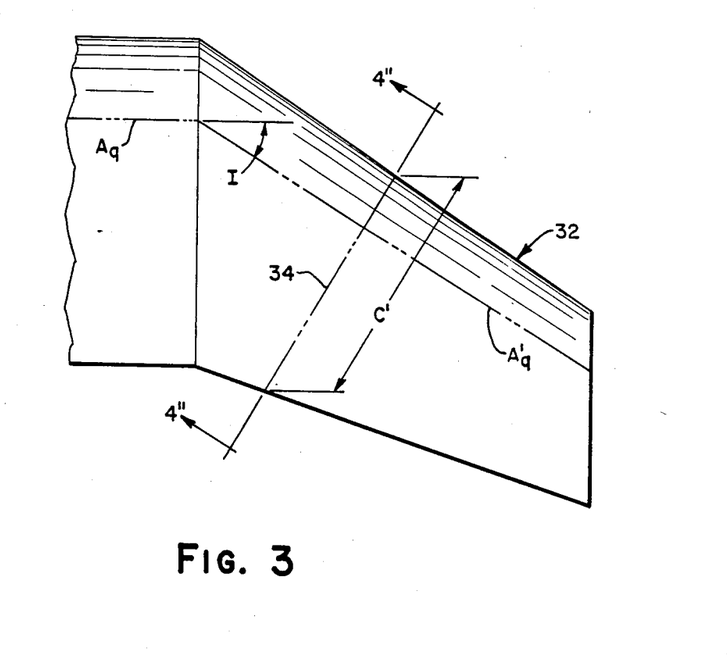
FIG. 3 is an enlarged view of part of the tip portion of the rotor blade shown in FIG. 2.

FIG. 3 is an enlarged view of the end 32 of the tip portion of the rotor blade shown in FIG. 2. The end of the tip has a quarter chord axis $A_q'$ which intersects the quarter chord axis $A_q$ of the main portion of the blade at an angle I. A chord line 34 of length C' extends perpendicular to the quarter chord axis.

Figure 4:
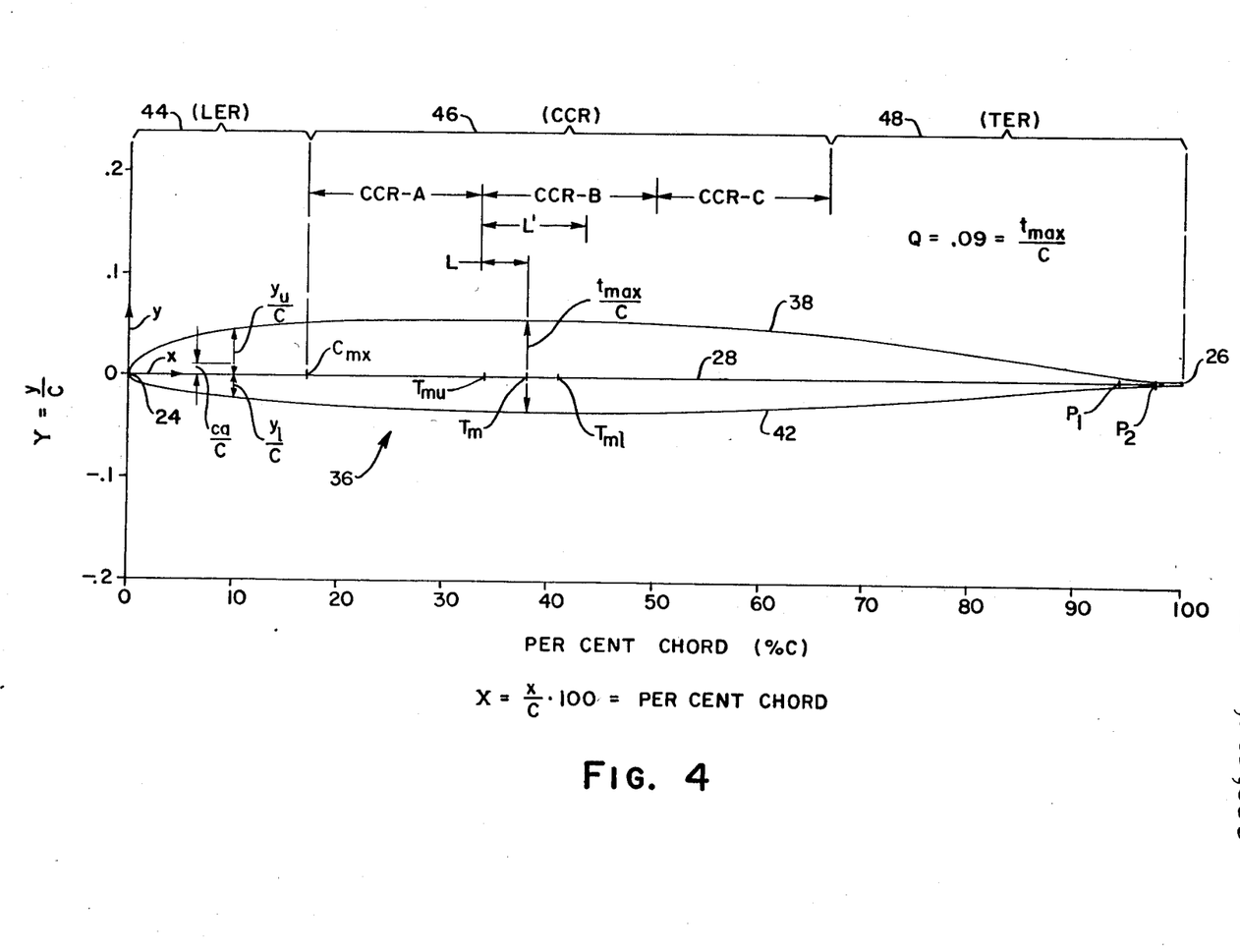
FIG. 4 is a cross-sectional view of an airfoil section of a rotor blade taken along the lines 4—4 of FIG. 1.

FIG. 4 is a cross section of the rotor blade 14 taken along the lines 4—4 of FIG. 1 and shows the airfoil shape of the rotor blade. The section lies in a plane which is parallel to the axis of rotation $A_r$ and perpendicular to the quarter chord axis. A similar section would result from taking sections along the lines 4'—4' of FIG. 2 or 4"—4" of FIG. 3. Each of these rotor blades has an airfoil shaped cross section 36 which belongs to a family of airfoil sections referred to as the SSC-Axx family of airfoil sections.

The airfoil section 36 includes the leading edge 24, the trailing edge 26 and the chord line 28 of chord length C. The airfoil section has an upper surface 38 and a lower surface 42 which intersect at the leading edge. A coordinate system has a reference x-axis and a reference y-axis for describing the airfoil section. The axes intersect at an origin at the leading edge. The reference x-axis is co-incident with the chord line. A nondimensionalized distance X along the x-axis is the value of x divided by the length C of the chord line (X=x/C). The reference y-axis is perpendicular to the chord line.

The upper surface is spaced a distance $y_u$ from the chord line at any point X. The distance $y_u$ is commonly called the thickness of the upper surface. A nondimensionalized distance $Y_u$ at any point X is equal to the actual distance $y_u$ from the chord line to the upper surface divided by the length C of the chord line ($Y_u = y_u/C$). The lower surface 42 is spaced a distance $y_l$ from the chord line at any point X. The distance $y_l$ is commonly called the thickness of the lower surface. A nondimensionalized distance $Y_l$ at any point X is equal to the actual distance $y_l$ from the chord line to the lower surface divided by the length C of the chord line ($Y_l = y_l/C$).

The thickness t of the airfoil at any point X along the chord line is the distance between the upper surface and the lower surface measured perpendicular to the chord line. The thickness t is equal to the summation of $y_u$ and $y_l$ ($t = y_u + y_l$). The airfoil has a maximum thickness $t_{max}$ which lies in a range of six percent to eleven percent of the length C of the chord line ($0.06C < t_{max} < 0.11C$). A nondimensionalized thickness $\bar{t}$ is equal to the thickness t divided by the length C. The representation of the thicknesses along the length of the airfoil section is a thickness distribution.

Camber is a measure of the shifting of the thickness of the airfoil at any point away from the chord line in the y direction. The camber ca at any point is the distance from the chord line to a point halfway between the upper and lower surfaces ($ca = y_u + y_l/2$). A nondimensionalized camber Ca is equal to the camber ca divided by the length of the chord line C ($Ca = ca/C$). The camber distribution is a representation of the shifting of the thickness distribution with respect to the chord line along the length of the airfoil section. Together, the thickness distribution and the camber distribution define every point lying on the upper surface and the lower surface of the airfoil.

The upper surface has a slope $Y_u'$ ($Y_u' = dY_u/dX$) and a bend $Y_u''$ ($Y_u'' = d^2Y_u/dX^2$) with respect to the coordinate system. The bend is a measure of the change in the slope of the upper surface as the upper surface curves toward the chord line. Similarly, the lower surface has corresponding quantities $Y_l'$ and $Y_l''$. There is no bend in either surface with respect to the chord line when the slope is zero or a constant (Y'=0, constant value). The surface bends with respect to the chord line at a constant rate (i.e., $Y_u''$ is a constant) when the value of the second derivative is equal to a constant value. Similarly, where the change in the bend of the surface is constant, a curve representing the quantity Y" as a function of chord position has a constant slope. This invention is predicated in part on the recognition that at certain critical regions of the airfoil either the bend of the surface or the rate of change of the bend of the surface must be constant.

A useful normalizing quantity Q for generating a family of airfoils is equal to the maximum thickness $t_{max}$ of the airfoil divided by the length C of the chord line ($Q = t_{max}/C$). Each airfoil in the family has a unique value of Q. For the new family of airfoils, the value of Q ranges from six-hundredths to eleven-hundredths ($0.06 \leq Q \leq 0.11$). As shown in Table 1, an airfoil section of the SSC-Axx family has a normalized thickness TN at any point X equal to the nondimensionalized thickness $\bar{t}$ ($\bar{t} = t/C$) divided by the quantity Q (TN=$\bar{t}/Q$). The normalized thickness distribution is graphically represented by FIG. 5. The airfoil section has a normalized camber CN at any point X equal to the nondimensionalized camber Ca divided by the quantity Q, i.e. CN=Ca/Q. The normalized camber distribution is shown in Table 1 and is graphically represented by FIG. 6. The right hand axes show the nondimensionalized camber Ca for an airfoil section having a Q of nine-hundredths ($Q=0.09=t_{max}/C$) and an airfoil section having a Q of seven-hundredths ($Q=0.07$).

The distances, slopes and bends of the upper surface 38 and the lower surface 42 are normalized in the same way. A normalized distance $D_u$ is equal to the distance $Y_u$ divided by the quantity Q ($D_u = Y_u/Q$). A normalized distance $D_l$ is equal to the distance $Y_l$ divided by the quantity Q ($D_l = Y_l/Q$). The slope $Y_u'$ of the upper surface and the slope $Y_l'$ for the lower surface are normalized by dividing by the quantity Q. The upper surface normalized derivative is $D_u'$ ($D_u' = Y_u'/Q$). The lower surface normalized derivative is $D_l'$ ($D_l' = Y_l'/Q$). These quantities are shown in Table 2 and are graphically represented by FIG. 7. The righthand axes show the values of the slopes $Y_u'$ and $Y_l'$ for an airfoil section having a normalizing quantity of nine-hundredths ($Q=0.09$) and an airfoil section having a normalizing quantity of seven hundredths ($Q=0.07$).

The bend of the upper surface $Y_u''$ and the bend of the lower surface $Y_l''$ are each normalized by dividing by the quantity Q. The normalized bend $D_u''$ ($D_u'' = Y_u''/Q$) for the upper surface and the normalized bend $D_l''$ ($D_l'' = Y_l''/Q$) for the lower surface are shown in Table 2 and are graphically represented by FIG. 8. The righthand axes shows the bend $Y_u''$ of the upper surface and the bend $Y_l''$ of the lower surface for an airfoil section having a Q of nine hundredths ($Q=0.09$) and an airfoil section having a Q of seven hundredths ($Q=0.07$).

Figure 9:
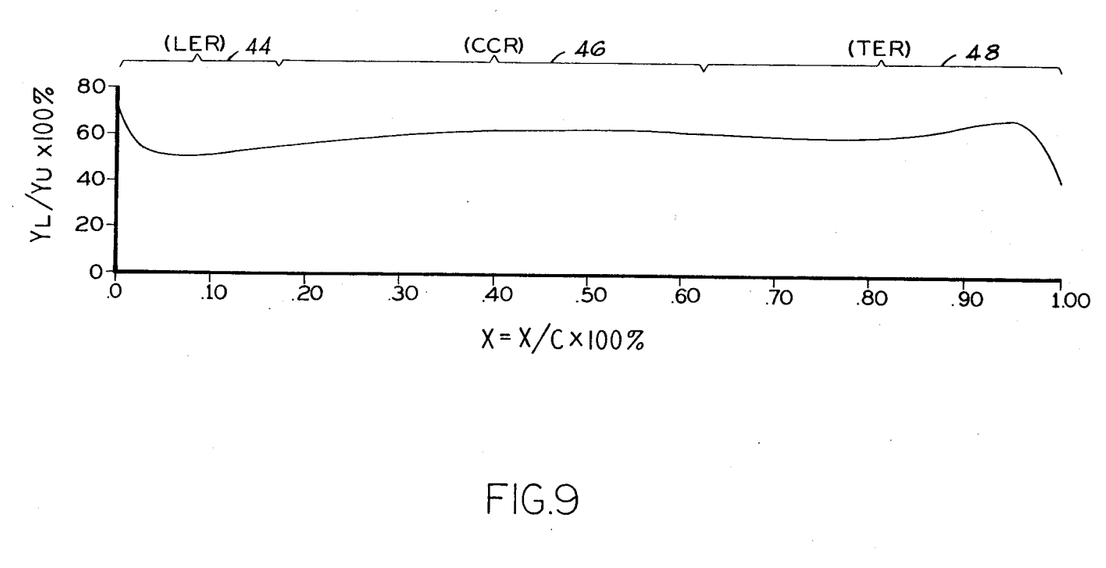
FIG. 9 is a graphical representation of the ratio of the thickness of the lower surface to the upper surface as a function of chord position along the chord line of the airfoil section of FIG. 4.

FIG. 9 shows the comparative thinness of the lower surface relative to the thickness of the upper surface by showing the ratio of the thickness of the lower surface to the thickness of the upper surface. The ratio of thicknesses lies in the range of fifty to seventy percent over all but the last two percent of the chord length and is nearly constant over substantially the entire length of the airfoil.

Figure 6:
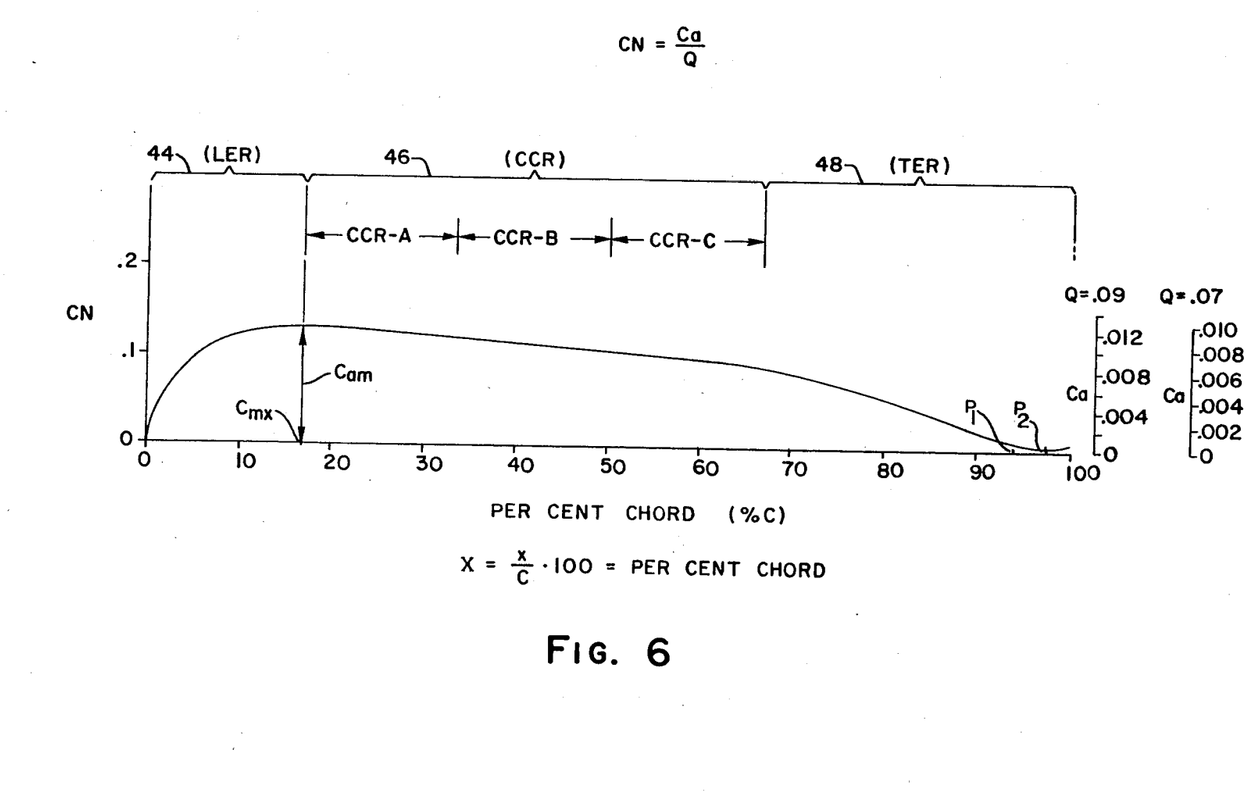
FIG. 6 is a graphical representation of the normalized camber distribution CN of the airfoil section shown in FIG. 4, the normalized camber being listed in Table 1 as a function of the chord position along the chord line of the airfoil section of FIG. 4.

The airfoil section 36 defined by the upper surface 38 and the lower surface 42 has three principal regions: a leading edge region 44; a central chord region 46; and a trailing edge region 48. As shown in FIG. 4 and FIG. 6, the leading edge region (LER) extends from the leading edge to the point Cmx of maximum camber Cam. The central chord region (CCR) extends from the leading edge region to a point beyond the midpoint of the airfoil section at approximately two-thirds of the length of the chord from the leading edge (referred to as the two-thirds chord position or more briefly as "two-thirds chord") at which the camber is greater than sixty-five percent of the maximum camber and in the region of the airfoil at which the slope of the camber distribution becomes at least twice as negative as the average negative slope over the central chord region. Thus, the end point of the central chord region is found by comparing the slope (first derivative) of the camber distribution at a point beyond the midpoint of the airfoil section with the average slope of the camber distribution between the start of the central chord region and that point. The end point is found when the slope reaches a value which is at least twice as negative as the average slope.

In the leading edge region 44, the lower surface 42 is coincident with a first circular curve at the leading edge and is faired into and coincident with a portion of this curve between the leading edge and the one-half percent chord position (0.5% C). The first circular curve intersects the leading edge and has an origin on the chord line. The first circular curve has a radius $R_1$. The lower surface has a normalized radius $R_l$ at the leading edge and over the region on which the lower surface is coincident with the first circular curve. The normalized radius $R_l$ is equal to the first radius $R_1$ divided by the length C to nondimensionalize the first radius and is divided by the quantity Q to normalize the first radius. The normalized first radius is equal to the quantity sixty-six hundredths multiplied by the nondimensionalized maximum thickness $\bar{t}_{max}$ ($\bar{t}_{max} = t_{max}/C$), i.e., $R_l = R_1/(Q \cdot C) = 0.66\ t_{max}/C$.

The upper surface 38 is tangent to the lower surface 42 and coincident with a second circular curve at the leading edge 24. The upper surface is faired into and coincident with a portion of the second circular curve between the leading edge and the one-half percent chord position (0.5% C). The second circular curve intersects the leading edge and has an origin on the chord line. The second circular curve has a radius $R_2$. The radius $R_2$ is approximately twice the radius $R_1$. The upper surface has a normalized radius $R_u$ at the leading edge and over the region in which the upper surface is coincident with the second circular curve. The normalized radius $R_u$ is equal to the radius $R_2$ divided by the quantity C to nondimensionalize the second radius and is divided by the quantity Q to normalize the second radius. The normalized radius $R_u$ is equal to the quantity one and twenty-four hundredths multiplied by the non-dimensionalized maximum thickness ($\bar{t}_{max} = t_{max}/C$), i.e., $R_u = R_2/C \cdot Q = (1.24\ t_{max}/C)$.

In the leading edge region the point Cmx of maximum camber Cam occurs at seventeen percent chord (17% C). The camber of the airfoil section reaches ninety percent of the maximum camber (90% Cam) at the midpoint of the leading edge region and remains above ninety-five percent of the maximum camber from the ten percent chord position (10% C) to the end of the leading edge region.

The thickness t of the airfoil section in the last half of the leading edge region increases from over sixty percent of the maximum thickness (60%·$t_{max}$) to over eighty-five percent of the maximum thickness (85% $t_{max}$). The ratio of the nondimensionalized thickness $Y_l$ of the lower surface to the nondimensionalized thickness $Y_u$ of the upper surface in the leading edge region beyond the two percent chord position (2% C) is approximately equal to 50 percent ($Y_l/Y_u \approx 50\%$) ranging in value between fifty and fifty-five percent as shown in FIG. 9.

Figure 8:
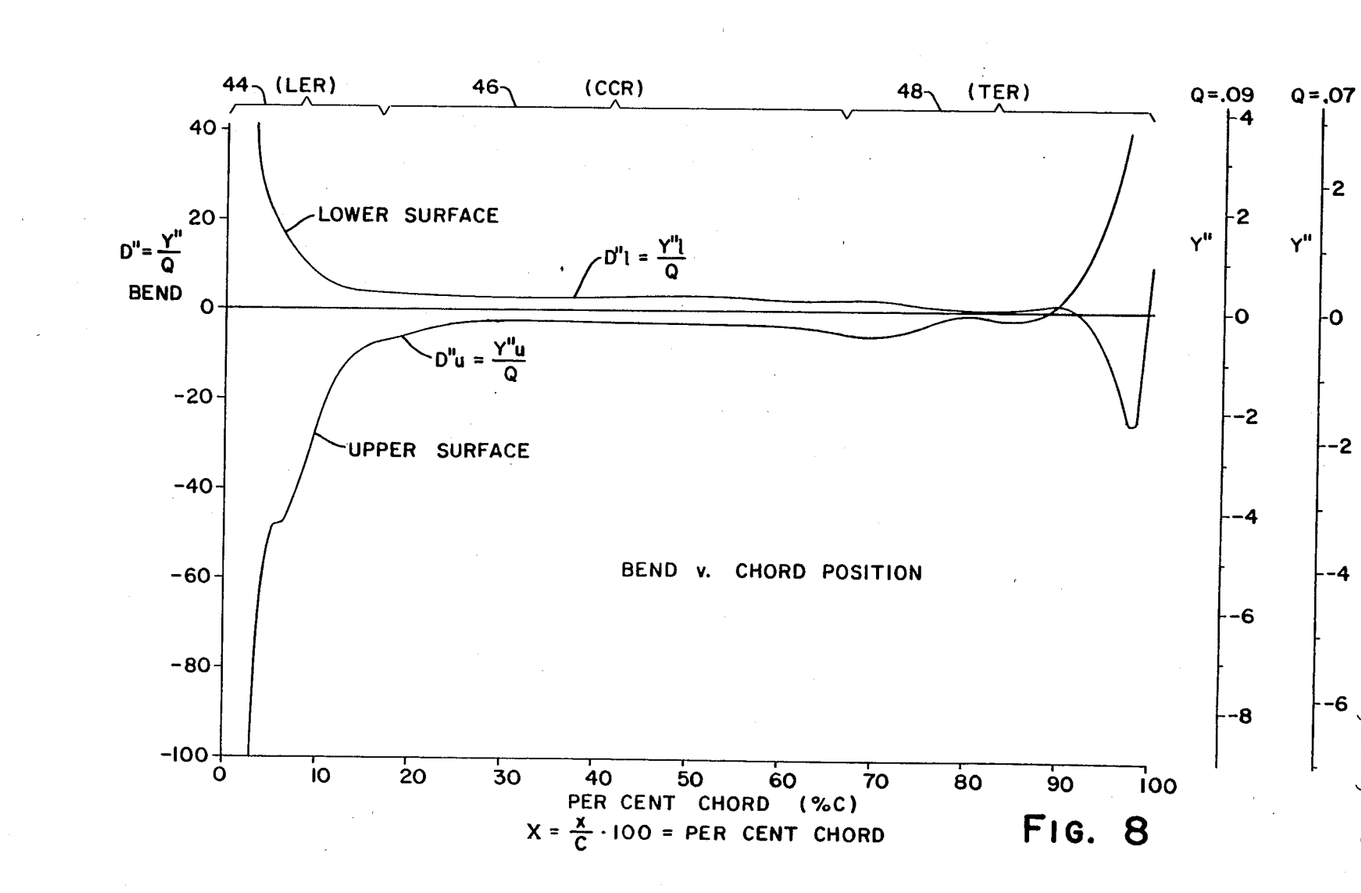
FIG. 8 is a graphical representation of the normalized bend D" (normalized second derivative) toward the chord line of the upper surface and the lower surface of the airfoil section shown in FIG. 4, the normalized bend being listed in Table 2 as a function of chord position along the chord line of the airfoil section of FIG. 4.

The thickness distribution and camber distribution are selected to cause the upper surface and the lower surface to curve toward the conical chord line with a rapid decrease in bending with the bend of the surfaces decreasing continuously in the leading edge region. As shown in FIG. 8, the bend decreases on the upper surface at a nearly constant rate over the middle portion of the leading edge region from a point at seven percent chord to a point at eleven percent chord (7%–11% C). This minimizes the maximum local Mach number on the upper surface at positive angles of attack keeping the local Mach number below one and two-tenths (M<1.2) under normal, level flight operating conditions at positive angles of attack at the velocities shown in FIG. 1. As shown in Table 2, the bend on the lower surface decreases continuously over the leading edge region at a rapidly decreasing rate between the leading edge and one percent chord (0–1% C). For example the rate of decrease of the bend between two hundredths of a percent chord (0.02% C) and a third of a percent chord (0.33% C) is a hundred times greater than the rate of decrease between a third of a percent chord and two-thirds of a percent chord. The rate of decrease between a third of a percent chord and two-thirds of a percent chord is only four times greater than the rate of decrease between two-thirds of a percent C (0.666% C) and one percent chord (1% C). This rapidly decreasing rate of decrease in bending on the lower surface between zero and one percent chord minimizes the local Mach number on the lower surface at zero and negative angles of attack keeping the local Mach number below one and two-tenths (M<1.2) under normal, level flight operating conditions at the velocities shown in FIG. 1 and avoiding the formation of strong, normal shock waves at these Mach numbers.

As discussed above, the central chord region 46 of the airfoil section extends from the leading edge region to a point at approximately two-thirds C (66⅔% C). The camber of the airfoil section decreases in the central chord region from one hundred percent of the maximum camber (100% Cam) at the beginning of the central chord region at a nearly uniform slope as shown in FIG. 6 across the central chord region to the end of the central chord region.

The central chord region is divided into thirds. The first third of the central chord region, CCR-A, extends from seventeen percent chord to thirty-three percent chord (17%–33% C). The middle third of the central chord region, CCR-B, extends from the thirty-three percent chord position to the fifty percent chord position (33%–50% C). The last third of the central chord region, CCR-C, extends from the fifty percent chord position to the two-thirds chord position (50%–66⅔% C).

The thickest portion of the airfoil section lies within the middle third of the central chord region. The maximum thickness $t_{max}$ of the airfoil section is located at a point Tm, the point Tm being located at thirty-eight percent chord (38% C) plus or minus a length of two percent of the length C (2% C). The maximum thickness $Y_{umax}$ of the upper surface is within the middle third of the central chord region at a point Tmu lying within a length L of four percent chord (L=4% C) forward of the point Tm. The lower surface has a maximum thickness $Y_{lmax}$ at a point Tml which lies rearwardly of the point Tm. The points Tm, Tmu and Tml all lie within a length L' equal to ten percent of the chord length (L'=10% C).

The ratio of the thickness $Y_l$ of the lower surface 42 to the thickness $Y_u$ of the upper surface 38 in the central chord region is approximately equal to sixty percent ($Y_l/Y_u \approx 60\%$), with the ratio lying in the range of fifty-four to sixty-four percent (54%–64%).

As shown in FIG. 8, the upper surface and lower surface for any member of the family curve toward the chord line with a bend Y" that is slight having on the upper surface an absolute value less than five-tenths (0.5) over eighty percent (80%) of the central chord region and having on the lower surface an absolute value less than five-tenths (0.5) over the entire central chord region. The bend on the lower surface is positive and the bend on the upper surface is negative to cause these surfaces to curve toward the chord line. Each bend is relatively constant having an absolute mean value $\overline{Y}''$ and a deviation from the absolute value that lies within a range of plus or minus fifteen-hundredths, the deviation from the mean value on the upper surface being measured over eighty percent (80%) for the central chord region and on the lower surface being measured over the entire central chord region. The absolute mean value $Y_u''$ of an airfoil having a normalized quantity Q equal to eleven percent (Q=11%) is approximately equal to three-tenths ($\overline{Y}_u'' \approx 0.3; Q=0.11$).

Figure 7:
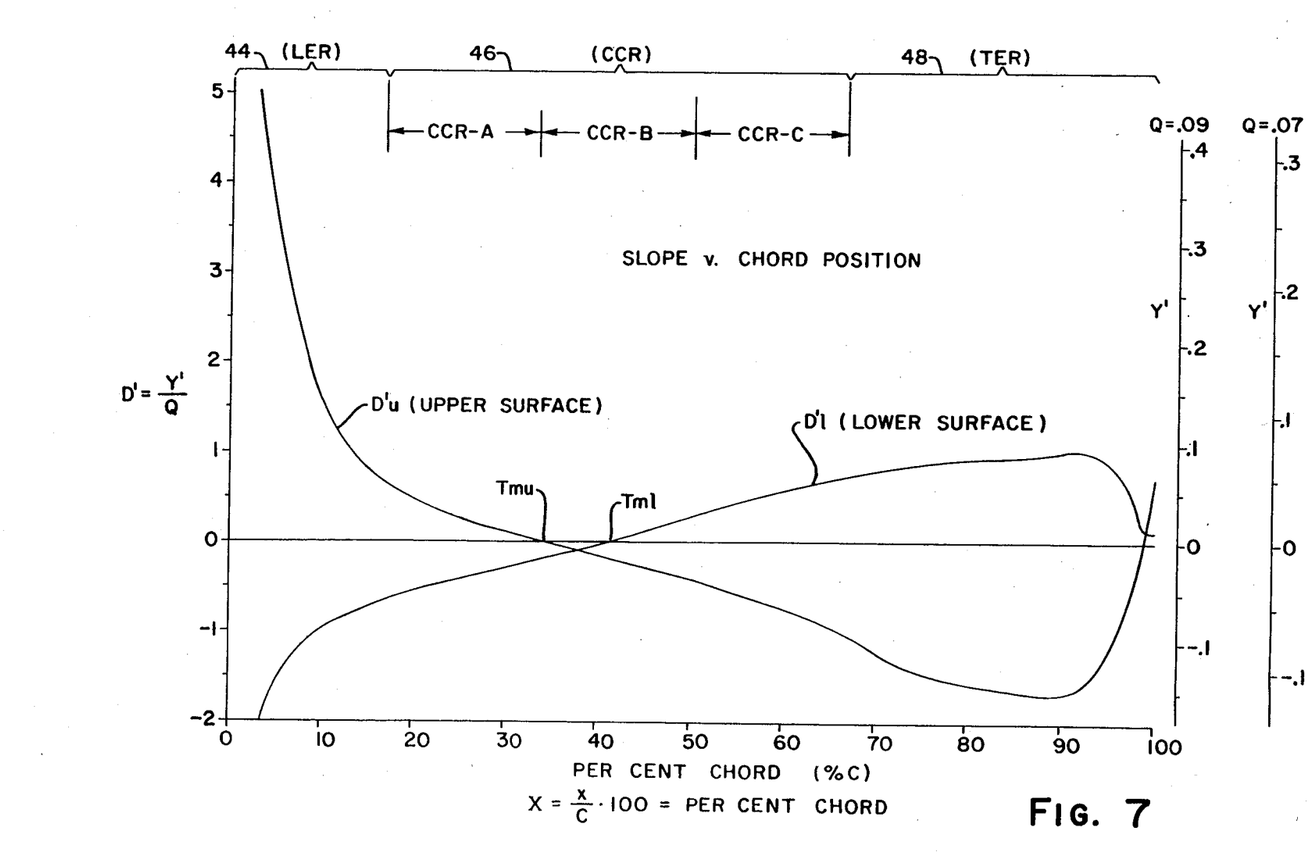
FIG. 7 is a graphical representation of the normalized slope D' of the surfaces of the airfoil section shown in FIG. 4, the normalized slope being listed in Table 2 as a function of the chord position along the chord line of the airfoil section of FIG. 4.

By reason of the slight bend $Y_u'', D_u''$, the relatively constant value of the bend, the closeness of the points Tm, Tmu and Tl and the similar shape and nearly equal values of the slope of both surfaces as shown in FIG. 7, the upper surface has the same degree of flatness as the lower surface, with neither of the surfaces being more curved than the other. The contour of the surfaces avoids the formation of strong, normal shock waves at local Mach numbers on the surfaces below one and two-tenths (M<1.2) at low or negative angles of attack and reduces drag creep under normal, level flight operating conditions.

Figure 5:
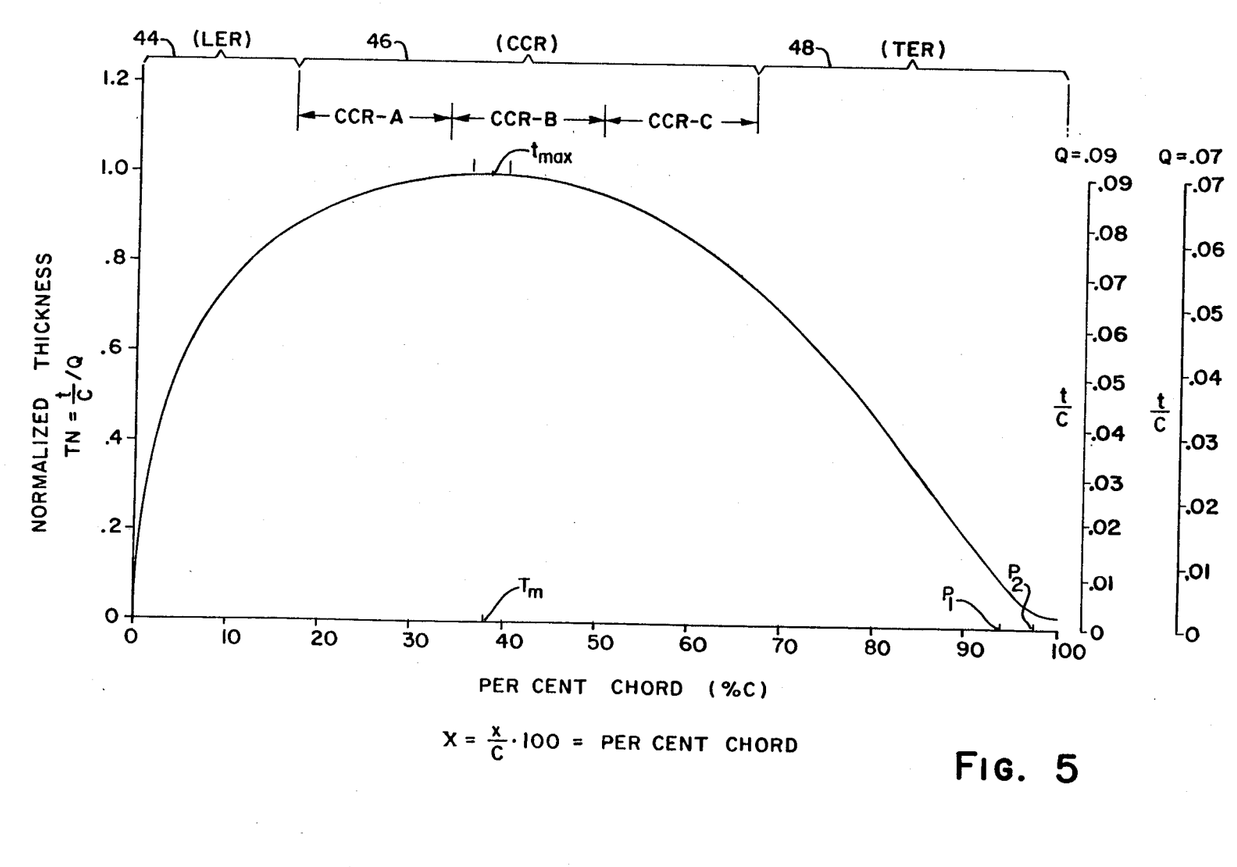
FIG. 5 is a graphical representation of the normalized thickness distribution TN of the airfoil section shown in FIG. 4, the normalized thickness being listed in Table 1 as a function of the chord position along the chord line of the airfoil section of FIG. 4.

The trailing edge region (TER) 48 extends from the central chord region 46 at approximately two-thirds chord to the trailing edge at one hundred percent chord (100% C). The camber of the airfoil section decreases rapidly at an average slope in the trailing edge region which is three to three and half the times the average slope of the decrease in camber over the central chord region. The camber decreases continuously from seventy percent of the maximum camber at the beginning of the trailing edge region to less than ten percent of the maximum camber (i.e. 7% of the maximum camber) at a first reflex point $P_1$. The first reflex point is approximately ninety-five percent chord (95% C) and actually lies slightly forward of that position being located at ninety-four percent chord (94% C). The camber distribution terminates in a trailing edge reflex beginning at the first reflex point, the camber decreasing to a minimum value at a second reflex point $P_2$ and increasing to a value at the trailing edge that at least equals the camber at the first reflex point. The second reflex point is at ninety-seven and one-half percent chord. The value of the camber at the second reflex point is four percent of the maximum camber (4% Cam). The camber increases reaching seven percent of the maximum camber (7% Cam) at the trailing edge. The thickness distribution decreases rapidly from seventy percent of the maximum thickness (70% $t_{max}$) to less than five percent of the maximum thickness (5% $t_{max}$) at the second reflex point reaching three percent of the maximum thickness (3% $t_{max}$) at the trailing edge as is shown in FIG. 5.

The ratio of the thickness $Y_l$ of the lower surface to the thickness $Y_u$ of the upper surface in the trailing edge region forward of the second reflex point is approximately equal to sixty-five percent and ranges between sixty and sixty-eight percent.

In the trailing edge region, 48, the lower surface 42 curves toward the chord line, the lower surface having a small, constant bend approximately equal to the bend of the lower surface in the central chord region to continue the slope of the central chord region to a point one-quarter of the way into the trailing edge region. The lower surface continues from the one-quarter point with almost no bending toward chord line ($D_u 41 \approx 0$) to a point three-quarters of the way into the trailing edge region. The lower surface at the three-quarters point curves away from the chord line to a slope at approximately ninety-nine percent chord (99% C) having a small positive value which continues to the trailing edge providing a thin trailing edge region which terminates in a flattened tab. The upper surface 42, to complete the trailing edge reflex, decreases the bend slightly toward the chord line from the beginning of the trailing edge region to the three-quarters point. From the three-quarters point to the trailing edge, the surface bends away from the chord line, diverging as does the upper surface, with the ratio of the thicknesses of the lower surface and upper surface being approximately equal to sixty-five percent to increase the drag divergence Mach number.

The trailing edge region is designed to provide a pitching moment resulting in a pitching moment coefficient Cm which lies between zero and minus fifteen thousandths (0<Cm<−0.015) and which is more negative than minus ten thousandths (Cm<−0.010) prior to the onset of drag divergence but which is not more negative than thirty thousandths (Cm<−0.030). The pitching moment coefficient at low speed and zero lift is less than minus ten thousandths (Cm<−0.010) which is superior to an equivalent airfoil not having such a trailing edge reflex.

The maximum coefficient of lift at a Mach number of three-tenths (M=0.3) for airfoil sections of the SSC-Axx family as a function of the drag divergence Mach number is shown in FIG. 10. As can be seen, comparable airfoil sections of the SSC-Axx family perform better than the exemplary airfoil section of the SC10xx family. The SSC-Axx sections have a higher divergence Mach number for a given lift and have a greater coefficient of maximum lift for the same drag divergence Mach number. The SSC-Axx family is a complementary family of airfoils to the SC10xx R8 family of airfoils. Accordingly, a rotor blade may be made which incorporates airfoil sections from both the SC10xx R8 family and the complementary SSC-Axx family.

Although the invention has been shown and described with respect to detailed embodiments thereof, it should be understood by those skilled in the art that various changes in form and detail thereof may be made without departing from the spirit and the scope of the claimed invention.

I claim:

1. In a rotor blade of the type used in a rotorcraft having an axis of rotation, the rotor blade extending spanwisely from the axis of rotation and having a tip portion which comprises the outermost thirty percent (30%) of the span, the tip portion having an airfoil section which has a leading edge, a trailing edge, an upper surface extending between the leading edge and the trailing edge, a lower surface extending between the leading edge and the trailing edge, a chord line of length C extending between the leading edge and the trailing edge, the chord line providing a reference axis for a coordinate measured parallel to the chord line from the leading edge, the coordinate being expressed as a function of the length C, the improvement which comprises:

an airfoil section in the tip portion of the rotor blade which has a thickness t between the upper surface and the lower surface along a line perpendicular to the chord line, the ratio of the thickness of the lower surface $Y_l$ to the thickness of the upper surface $Y_u$ measured from the chord line lying in a range of from fifty percent to seventy percent ($50\% \leq Y_l/Y_u \leq 70\%$), the thickness t having a maximum value $t_{max}$ which lies in a range of six percent to eleven percent of the length C ($0.06C \leq t_{max} \leq 0.11C$), the airfoil section having a leading edge region, a central chord region and a trailing edge region, the airfoil being characterized by;

a thick leading edge region which extends from the leading edge to approximately twenty percent chord (20% C), which is highly cambered reaching the maximum value of camber at the end of the leading edge region, the leading edge region having upper and lower surfaces curving toward the chord line with a bend on each surface that continuously decreases, the bend on the upper surface decreasing at a nearly constant rate over the middle portion of the leading edge region to minimize the maximum local Mach number on the upper surface at positive angles of attack and the bend on the lower surface decreasing at a rapidly decreasing rate between the leading edge and one percent (1%) chord to minimize the local Mach number at zero and negative angles of attack;

a thick central chord region which extends from the leading edge region, the central chord region having a thickness t greater than eighty percent of the maximum thickness $t_{max}$ ($t > 0.80 t_{max}$) in the front two-thirds (⅔) of the central chord region, having a camber distribution which decreases rearwardly from the leading edge region and beyond the midpoint of the leading edge region (50% C) at an average rate, and being nearly as flat on the upper surface as on the lower surface over the length of the central chord region with a uniform bend on the upper and lower surfaces to avoid strong, normal shock waves at local Mach number on the surfaces below one and two-tenths ($M \leq 1.2$) at low or negative angles attack and to reduce drag creep under normal level flight conditions; and a trailing edge region which extends from the central chord region to the trailing edge, the thickness of the airfoil and the camber of the airfoil in the trailing edge region decreasing rapidly at a rate which is approximately three times the rate of decrease of camber and thickness over the central chord region, the trailing edge region terminating in a trailing edge reflex having a flattened tab between ninety-seven and one-half percent chord (97.5% C) and the trailing edge.

2. In a rotor blade of the type adapted for use in a rotor craft having an axis of rotation, the rotor blade extending spanwisely from the axis of rotation and having a root portion, a central portion and a tip portion which comprises the outermost thirty percent (30%) of the span, the rotor blade having a quarter chord axis and an airfoil shaped cross section, the airfoil section extending in a plane which is parallel to the axis of rotation and perpendicular to the quarter chord axis, the airfoil section including a leading edge, a trailing edge, and a chord line of chord length C extending from the leading edge to the trailing edge, the chord line providing a reference axis for a coordinate measured parallel to the chord line from the leading edge, the coordinate being expressed as a function of the chord length C, the airfoil section including an upper surface and a lower surface which intersect at the leading edge, the airfoil section having a thickness t between the upper surface and the lower surface along a line perpendicular to the chord line, the thickness t having a maximum value $t_{max}$ which lies in a range of six percent to eleven percent of the length C ($0.06C \leq t_{max} \leq 0.11C$), the airfoil section further including both a thickness distribution and a camber distribution disposed about the chord line such that the upper surface is spaced a distance $Y_u$ from the chord line and the lower surface is spaced a distance $Y_l$ from the chord line, the values $Y_u$ and $Y_l$ varying between positions on the chord line, the improvement which comprises:

an airfoil shaped cross section for the tip portion of the rotor blade which has a maximum camber Cam at a point Cmx on the chord line, which has a leading edge region extending from the leading edge to the point Cmx, which has a central chord region extending from the leading edge region to a point in the region of the airfoil section at which the slope of the camber distribution becomes at least twice as negative as the average slope over the central chord region, and which has a trailing edge region which extends from the central chord region to the trailing edge, A. the leading edge region of the airfoil section extending from the leading edge to the point Cmx of maximum camber Cam;

A1. the camber of the airfoil section reaching ninety percent of the maximum camber (90% Cam) at the midpoint of the leading edge region and remaining above ninety percent of the maximum camber in the last half of leading edge region, A2. the thickness t of the airfoil section in the last half of the leading edge region increasing from over sixty percent of the maximum thickness (60% $t_{max}$) to over eighty-five percent of the maximum thickness t (85% $t_{max}$), A3. the ratio of the thickness $Y_l$ of the lower surface to the thickness $Y_u$ of the upper surface in the leading edge region beyond two percent chord (2% C) being approximately equal to fifty percent ($Y_l/Y_u \approx 50\%$), and A4. the upper surface and the lower surface curving toward the chord line with a rapid decrease in bending, the bend decreasing continuously in the leading edge region and decreasing on the upper surface over the middle portion of the leading edge region at a nearly constant rate to minimize the maximum local Mach number on the upper surface at positive angles of attack and at a rapidly decreasing rate on the lower surface between the leading edge and one percent chord to minimize the local Mach number on the lower surface at zero and negative angles of attack, B. the central chord region of the airfoil section extending from the leading edge region to the trailing edge region;

B1. the camber of the airfoil section decreasing in the central chord region from one hundred percent of the maximum camber (100% Cam) at the beginning of the central chord region at a nearly uniform slope across the central chord region to the end of the central chord region, B2. the thickest portion of the airfoil section lying within the middle third of the central chord region, the maximum thickness $t_{max}$ of the airfoil section being located at a point Tm, the upper surface having a maximum thickness $Y_{umax}$ at a point Tmu, and the lower surface having a maximum thickness $Y_{lmax}$ at a point Tml, the points Tm, Tmu and Tml all lying within a span L equal to ten percent of the chord length (L=10% C), the point Tmu lying forwardly of Tm and the point Tml lying rearwardly of point Tm, B3. the ratio of the thickness $Y_l$ of the lower surface to the thickness $Y_u$ of the upper surface in the central chord region being approximately equal to sixty percent ($Y_l/Y_u \approx 60\%$), B4. the upper surface and the lower surface being defined in the central chord region by curves having a bend toward the chord line, B4a. the bend being slight having on the upper surface an absolute value less than five-tenths (0.5) over eighty percent (80%) of the central chord region and having on the lower surface an absolute value less than five-tenths (0.5) over the entire central chord region, the bend on the lower surface being positive and the bend on the upper surface being negative, B4b. each bend being relatively constant having an absolute mean value $\overline{B}$ and a deviation from the absolute mean value that lies within a range of plus or minus fifteen hundredths, the deviation from the mean value on the upper surface being measured over eighty percent (80%) of the central chord region and on the lower surface being measured over the entire central chord region, C. the trailing edge region extending from the end of the central chord region to the trailing edge at one hundred percent chord (100% C);

C1. the camber of the airfoil section decreasing rapidly at an average slope which is three to three and a half times the average slope over the central chord region, the camber decreasing from the beginning of the trailing edge region to less than ten percent (10%) of the maximum camber at a first reflex point at approximately ninety-five percent chord (95% C), the camber distribution terminating in a trailing edge reflex beginning at the first reflex point, the camber decreasing to a minimum value at a second reflex point and increasing to a value at the trailing edge that at least equals the camber at the first reflex point, C2. the thickness distribution decreasing rapidly from seventy percent of the maximum thickness (70% $t_{max}$) to less than five percent of the maximum thickness (5% $t_{max}$) at both the second reflex point and at the trailing edge, C3. the ratio of the thickness $Y_l$ of the lower surface to the thickness $Y_u$ of the upper surface in the trailing edge region forward of the second reflex point being approximately equal to sixty-five percent ($Y_l/Y_u \approx 65\%$), C4. the lower surface of the trailing edge region curving toward the chord line, the lower surface having a small, constant bend approximately equal to the bend of the lower surface in the central chord region to continue the slope of the central chord region to a point one-fourth of the way into the trailing edge region, the surface continuing from the one-fourth point with almost no bending toward the chord line to a point three-fourths of the way into the trailing edge region, the lower surface at the three-fourths point curving away from the chord line to a slope at approximately ninety-nine percent chord (99% C) having a small positive value which continues to the trailing edge providing a thin trailing edge region which terminates in a flattened tab, C5. the upper surface, to complete the trailing edge reflex, decreases the bend slightly toward the chord line from the beginning of the trailing edge region to the three-fourths point, and from the three-fourths point to the trailing edge the surface bends away from the chord line, the ratio of thicknesses of the lower surface and upper surface being approximately equal to sixty-five percent (65%) to increase the drag divergence Mach number;

wherein the thickness distribution and camber distribution about the chord line provide an upper surface and a lower surface which together form a highly cambered, relatively thick leading edge region, and a constantly cambered, relatively thick central chord region, the upper surface and lower surface curving toward the chord line with a bend that continuously decreases over the entire length of the leading edge region at rates which avoid the formation of strong, normal shock waves at local Mach numbers on the surfaces below one and two-tenths (M<1.2) under normal, level flight operating conditions at positive, zero, and negative angles of attack, the upper and lower surfaces in the central chord region each curving toward the chord line with a constant, slight bend to avoid the formation of strong, normal shock waves at local Mach numbers on said surfaces below one and two-tenths (M<1.2) at low or negative angles of attack and to reduce drag creep under said operating conditions, the upper and lower surfaces in the trailing edge region having relative thicknesses and being contoured to provide a tapered region having a trailing edge reflex and a thin trailing edge terminating in a flattened tab to provide a satisfactory pitching moment and a higher drag divergence Mach number than sections not having such a trailing edge reflex and ratio of thicknesses between the upper and lower surfaces.

3. The rotor blade as claimed in claim 2 wherein the leading edge region extends from the leading edge to the seventeen percent chord (17% C) position, the central chord region extends from seventeen percent chord to two-thirds chord (66 ⅔% C) and the trailing edge region extends from two-thirds chord (66 ⅔% C) to the trailing edge;

wherein the middle portion of the leading edge region extends from seven percent chord to eleven percent chord (7% C–11% C);

wherein the point Tm of overall maximum thickness is located within two percent chord of the thirty-eight percent chord position (Tm=38 ±2% C), the point Tmu of maximum thickness on the upper surface lies forward of the point Tm within four percent chord of the point Tm and the point Tml of maximum thickness on the lower surface lies rearwardly of point Tm;

wherein the ratio of the thickness $Y_1$ of the lower surface to the thickness $Y_u$ of the upper surface in the leading edge region beyond two percent chord (2% C) lies within a range of fifty percent to fifty-five percent (50% $\leq Y_1/Y_u \leq$ 55%), the ratio in the central chord region lies in a range of fifty-four percent to sixty-four percent (54% $\leq Y_1/Y_u \leq$ 64%) and in the trailing edge region the ratio lies in a range of sixty percent to seventy percent (60% $Y_1/Y_u \leq$ 70%); and wherein in the trailing edge region the thickness distribution reaches three percent of the maximum thickness (3% $t_{max}$) at the trailing edge, and the camber decreases from seventy percent of the maximum camber (70% Cam) to seven percent of the maximum camber (7% Cam) at the first reflex point, the first reflex point being at ninety-four percent chord (94% C), and decreases to four percent of the maximum camber (4% Cam) at the second reflex point at ninety-seven and one-half percent chord (97.5% C) and increases to seven percent of the maximum camber (7% Cam) at the trailing edge.

4. The rotor blade of claim 3 wherein a first circular curve intersects the leading edge, has an origin on the chord line and has a first radius $R_1$; wherein a second circular curve intersects the leading edge, has an origin on the chord line, and has a second radius $R_2$ which is approximately twice the first radius $R_1$; wherein the lower surface is coincident with the first circular curve at the leading edge and is faired into and coincident with the first circular curve between the leading edge and the half percent chord position; and, wherein the upper surface at the leading edge is tangent to the lower surface and coincident with the second circular curve and is faired into and coincident with the second circular curve between the leading edge and the half percent chord position.

5. The airfoil section for a rotor blade as claimed in claim 3 which has a coordinate system having an origin at the leading edge, a reference x-axis coincident with the chord line and a reference y-axis perpendicular to the chord line;

wherein the airfoil section has a normalizing quantity Q equal to the maximum thickness $t_{max}$ divided by the length C of the chord line (Q=$t_{max}$/C), a normalized thickness TN equal to the thickness t divided by the length C and the quantity Q (TN=t/Q·C), and a normalized camber CN equal to the camber Ca divided by the quantity Q (CN=Ca/Q=Ca/Q·C), the normalized thickness TN and the normalized camber CN having the values listed in Table 1 for the listed values of X, X being equal to x divided by the length of the chord line (X=x/C);

wherein the curve defining the upper surface at any point X along the chord line is spaced the distance $Y_u$ from the chord line, has a slope $Y_u'$ and a bend $Y_u''$ with respect to the coordinate system and further has a normalized distance $D_u$ equal to the distance $Y_u$ divided by the quantity Q ($D_u=Y_u/Q$), a normalized slope $D_u'$ equal to the slope $Y_u'$ divided by the quantity Q, and a normalized bend $D_u''$ equal to the bend $Y_u''$ divided by the quantity Q, the normalized distance $D_u$ having the values listed in Table 1 and the normalized slope $D_u'$ and the normalized bend $D_u''$ having the values listed in Table 2 for the listed values of X, and wherein the curve defining the lower surface at any point X along the chord line is spaced a distance $Y_1$ from the chord line, has a slope $Y_1'$ and a bend $Y_1''$ with respect to the coordinate system and further has a normalized distance $D_1$ equal to the distance $Y_1$ divided by the quantity Q ($D_1=Y_1/Q$), a normalized slope $D_1'$ equal to the slope $Y_1'$ divided by the quantity Q, and a normalized bend $D_1''$ equal to the bend $Y_1''$ divided by the quantity Q, the normalized distance $D_1$ having the values listed in Table 1 and the normalized slope $D_1'$ and the normalized bend $D_1''$ having the values listed in Table 2 for the listed values of X.

6. The invention as claimed in claim 4 where the lower surface at the leading edge has a normalized radius Rl, the normalized radius Rl being equal to the first radius $R_1$ divided by the quantities Q and C and being equal to the quantity sixty-six hundredths multiplied by the maximum thickness $t_{max}$ (Rl=$R_1$/Q·C=0.66·$t_{max}$/C) and wherein the curve of the upper surface has a normalized radius $R_u$, the normalized radius $R_u$ being equal to the second radius $R_2$ divided by the quantity Q and C and being equal to the quantity one and twenty-four hundredths multiplied by the maximum thickness $t_{max}$ ($R_u=R_2$/Q·C =1.24·$t_{max}$/C).

* * * * *